United States Patent [19]

Lockery

[11] Patent Number: 4,979,580
[45] Date of Patent: Dec. 25, 1990

[54] FORCE MEASURING DEVICE WITH SENSITIVITY EQUALIZATION

[75] Inventor: Harry E. Lockery, Sudbury, Mass.

[73] Assignee: Flintab, Västerås, Sweden

[21] Appl. No.: 419,203

[22] Filed: Oct. 10, 1989

[51] Int. Cl.⁵ .................. G01G 3/14; G01L 25/00; G01L 1/22
[52] U.S. Cl. .................................. 177/211; 73/1 B; 73/862.67
[58] Field of Search .................. 177/211; 73/862.65, 73/862.67, 1 B

[56] References Cited

U.S. PATENT DOCUMENTS

| | | | |
|---|---|---|---|
| 4,380,175 | 4/1983 | Griffen | 177/211 X |
| 4,453,609 | 6/1984 | Griffen et al. | 177/211 |
| 4,556,115 | 12/1985 | Lockery et al. | 73/862.67 X |
| 4,577,709 | 3/1986 | Shibahara et al. | 177/211 |

Primary Examiner—George H. Miller, Jr.
Attorney, Agent, or Firm—Staas and Halsey

[57] ABSTRACT

A force or weight measuring load cell arrangement of the planar gaged plate load cell type with bending beam members is made insensitive to the point of load application by bonding strain gages alternately on the top surfaces and on the bottom surfaces of bending beam members and shunting half-bridges by pairs of substantially equal resistors to reduce the errors caused by corner loading.

5 Claims, 3 Drawing Sheets

FORCE MEASURING DEVICE WITH SENSITIVITY EQUALIZATION

BACKGROUND OF THE INVENTION

The present invention relates to improved load cells for precision measurement of weights and forces, especially to load cells of the Planar Gaged Plate design, and specifically to methods for making such load cells insensitive to the point of force application.

Planar Gaged Plate type load cell apparatus or arrangements for the measurement of force or weight have been in use for many years, and several methods for equalizing the sensitivities of individual sensing elements in different types of load cell arrangements are known in the art. All of the known devices and methods are complicated or require considerable vertical height, and lead to expensive load cell designs

SUMMARY OF THE INVENTION

The present invention overcomes the disadvantages of known load cell designs, and provides a force measuring load cell arrangement that has extremely low vertical space requirement, is inexpensive to manufacture and calibrate, and is extremely insensitive to the point of load application, so it can be used for very accurate force and weight measurements in low cost devices.

In accordance with this invention, a force measuring load cell apparatus comprises four substantially parallel and coplanar bending beam members, arranged essentially at the four corners of a rectangle, and subject to stresses caused by a force or weight to be measured, strain gage means mounted on each bending beam member in such a way that strain gage means mounted on adjacent bending beam members sense strains of opposite polarity, and strain gage means being connected in a bridge connection providing an output signal proportional to the sum of the strains sensed by said strain gage means, a first pair of substantially equal shunt resistors connected across strain gage means mounted on a first pair of bending beam members forming a first side of said rectangle, and a second pair of substantially equal shunt resistors connected across strain gage means mounted on a second pair of beam members forming a second side in said rectangle perpendicular to said first side.

DETAILED DESCRIPTION OF THE PREFERRED EMBODIMENT

Figure 1:
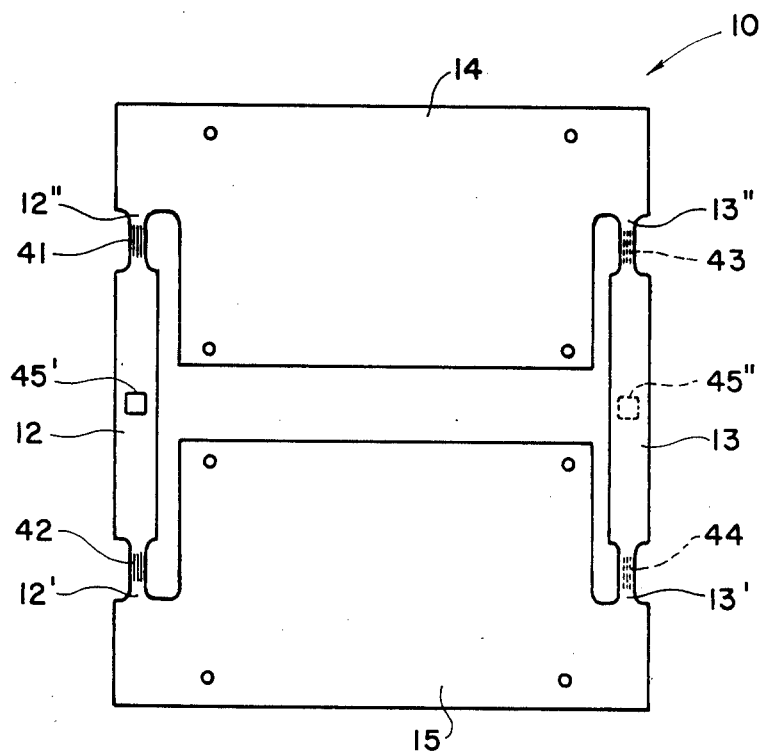
FIG. 1 is a plan view of a load cell arrangement according to a preferred embodiment of the invention.

FIG. 1 shows a load cell arrangement 10, which is made from a plate of aluminum or stainless steel by stamping, milling or other process, so that a left beam 12, a right beam 13, a support plate 14, and a receiver plate 15 are formed. The rear ends 12", 13" of the beams are rigidly connected together through the support plate 14, and the front ends 12', 13' of beams 12, 13 are rigidly connected together through the receiver plate 15. The width of beams 12, 13 has been narrowed near the ends 12', 12", 13', 13".

Figure 2:
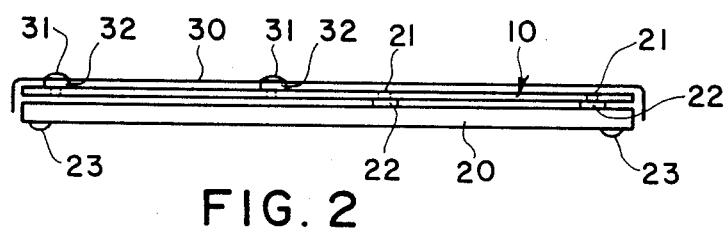
FIG. 2 is a side view, partially in section, of a scale incorporating the load cell arrangement according to FIG. 1.
Figure 3:
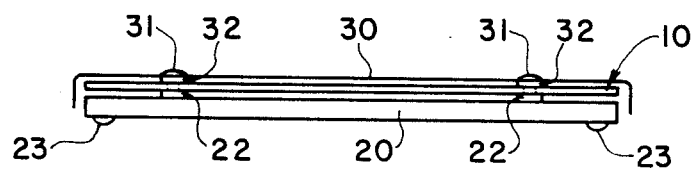
FIG. 3 is an end view, partially in section, of the scale according to FIG. 2.

As best shown in FIG. 2, the planar gaged plate load cell arrangement 10 is mounted on a base 20 by bolting the support plate 14 to the base with bolts or screws 21 and spacers 22. A loading plate 30 intended to receive merchandise to be weighed is bolted to the receiver plate 15 with bolts or screws 31 via spacers 32, as shown in FIGS. 2 and 3. The loading plate has its edges bent down to cover the edges of the load cell arrangement 10 and the sides of the base 20. The base 20 may be provided with feet 23 as illustrated.

The support plate 14 is kept horizontal at all times by its rigid connection to the base 20, but the beams 12, 13 will deflect when a load is placed on the loading plate 30. The amount of deflection depends on the load on the loading plate, and the shape of the deflection curve depends on where the center of gravity of the load is located relative to the front ends 12', 13' and the rear ends 12", 13" of the beams 12, 13. The spacers 22 and 32 provide the space necessary for the deflection.

Figure 4:
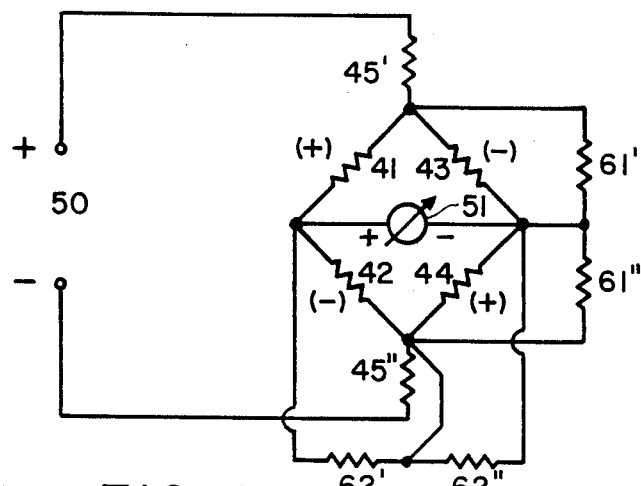
FIG. 4 is a schematic diagram of a bridge circuit including the strain gages of the load cell arrangement of FIGS. 1 to 3 and illustrating how resistors for equalizing the corner sensitivities may be connected thereto.

As shown in FIG. 1, four strain gages 41, 42, 43, 44 are mounted on the narrowed necks near the ends of the beams 12, 13. The front ends 12' and 13" and the read ends 12", 13" of the two beams 12, 13 form four separate bending beam members with strain gage means mounted on them. The strain gages 41, 42 on the left beam 12 are mounted on the top surface of the beam 12, and the strain gages 43, 44 on the right beam 13 are mounted on the underside of the beam 13. Temperature compensating resistors 45', 45" are also mounted on the beams 12, 13 as indicated in FIG. 1, resistor 45' being located on the top surface of beam 12 and resistor 45" being located on the bottom surface of beam 13. As shown in FIG. 4, the strain gages 41, 42, 43, 44 are connected in a bridge circuit with the arrangement of temperature compensating resistors 45', 45". A power supply 50 is connected to one bridge diagonal (A-B) in series with resistors 45', 45", and a measuring device 51 is connected across the other bridge diagonal (C-D).

Figure 5A:
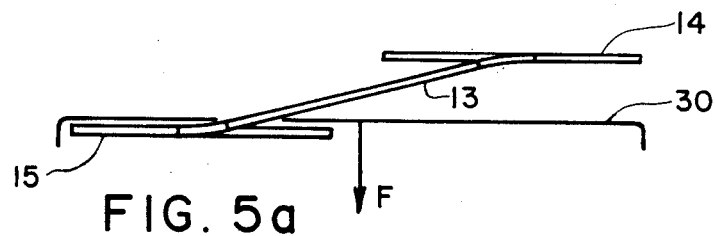
FIGS. 5a, 5b and 5c are illustrative views showing in exaggerated form the deflection pattern for the beams in the load cell arrangement according to FIG. 1, as seen from the right side of the load cell arrangement of FIG. 1, for three different load application points along the direction of the beam.
Figure 5B:
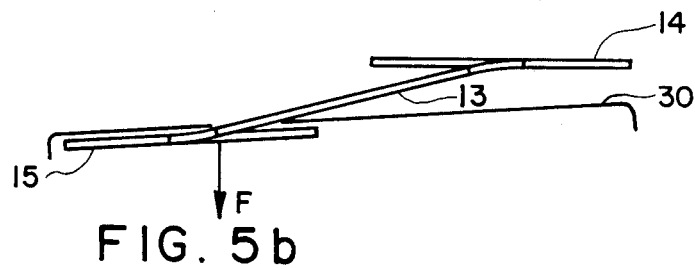
Figure 5C:
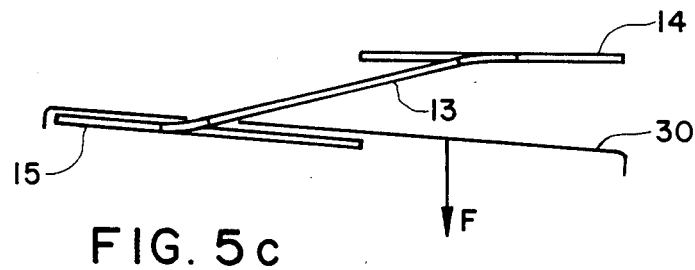

FIGS. 5a, 5b and 5c represent the deflection curve for both beams 12, 13, with the representative beam 13 being shown in exaggerated form for three different positions of the center of gravity. The center of gravity is assumed to be midway between the two beams 12, 13 in all three cases.

In FIG. 5a the center of gravity is located at the midpoint between the rear ends 12", 13" and the front ends 12', 13' of beams 12 and 13. In this case, the bending moments in the beams 12, 13 have the same magnitude but opposite signs at the front ends 12', 13' and the rear ends 12", 13", so the beams bend in a symmetrical S-shape as shown. The receiver plate 15 remains horizontal, and the strains sensed by strain gages 41 and 42, and 43 and 44, respectively, are equal but have opposite signs.

In FIG. 5b, the center of gravity of the load is closer to the front ends 12', 13'. The bending moments in the beams 12, 13 are accordingly smaller at the front ends 12', 13' than at the rear ends 12", 13". The beams still bend in an S-shape, as long as the center of gravity remains between the ends 12', 13' and 12", 13", but the S-shape is no longer symmetrical. The receiver plate 15 tilts forward as shown, and the strains measured by strain gages 41 and 43 are larger than those measured by strain gages 42 and 44.

In FIG. 5c, the center of gravity for the load is closer to the rear ends 12", 13". The bending moments in the beams 12, 13 are accordingly larger at the front ends 12', 13' than at the rear ends 12", 13". The deflection curve is still an unsymmetrical S-shape, but the receiver plate 15 now tilts rearward, and the strains measured by strain gages 41 and 43 are smaller than those measured by strain gage 42 and 44.

Figure 6A:
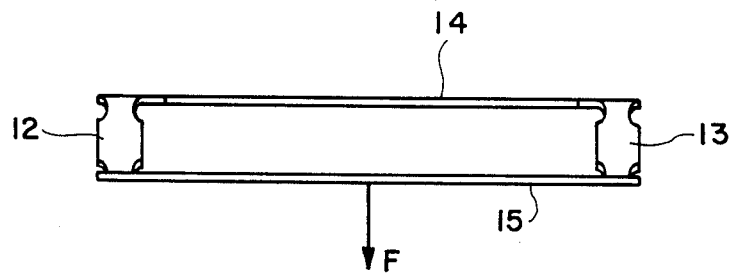
FIGS. 6a, 6b and 6c are views similar to FIG. 3, illustrating the effect of moving the center of gravity laterally relative to the beams.

FIG. 6a is a front view of the scale, as in FIG. 3, but with the receiving plate 15 deflected by a load with center of gravity midway between the two beams 12 and 13. The amount of deflection is exaggerated for clarity. The load is divided equally between the two beams 12 and 13, and the receiver plate 15 is horizontal.

Figure 6B:
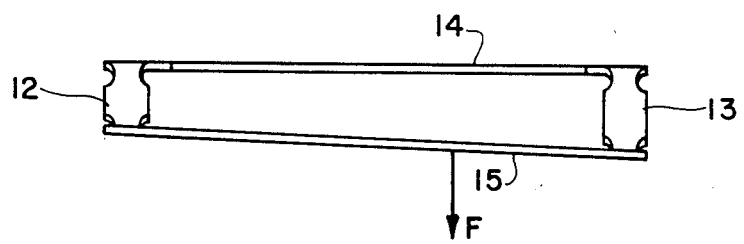

In FIG. 6b, the center of gravity is displaced to the right so it is closer to beam 13 than to beam 12. Beam 13 accordingly carries a larger load than beam 12, and it deflects more, so the receiver plate 15 tilts to the right as shown. The amount of tilt is exaggerated for clarity.

Figure 6C:
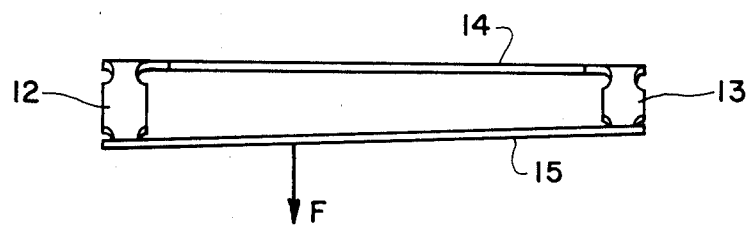

In FIG. 6c, the center of gravity is displaced to the left so it is closer to beam 12 than to beam 13. Beam 12 now carries a larger load than beam 13, and it deflects more, so the receiver plate 15 tilts to the left as shown. The amount of tilt is exaggerated for clarity.

It is readily understood by those skilled in the art from FIGS. 5a, 5b and 5c and FIGS. 6a, 6b and 6c that both beams 12 and 13 deflect in the S-shaped deflection pattern shown in FIGS. 5a–5c as long as the center of gravity is inside a rectangle with sides coinciding with the center lines of beams 12 and 13 and with corners at the ends 12', 12" and 13', 13" of the beams 12, 13. This means that strain gage 41 on top of the rear end 12"of beam 12 always senses tensile strain, while strain gage 42 on top of the front end 12' of beam 12 always senses compressive strain. Strain gage 43 at the rear end 13" of beam 13 is, however, on the bottom surface, so it always senses compressive strain, and strain gage 44 at the bottom of the front end 13' of beam 13 always senses tensile strain. This has been indicated in FIG. 4 by signs (+) for tensile strain and (−) for compressive strain next to the symbols for strain gages 41, 42, 43, 44.

If all four strain gages 41, 42, 43, 44 gave exactly the same for a certain change in strain, and if all the four necks 12', 12", 13', 13" had exactly the same stiffness, and if the positions of all four strain gages were exactly equal on the four necks, then the output of the bridge shown in FIG. 4 would be a true representation of the total load F on the load cell device for all positions of the center of gravity. In reality and due to practical manufacturing techniques, the above theoretical assumptions never happen, so it is necessary to adjust the sensitivity of the corners until they become equal. This can be done by filing the necks 12', 12", 13', 13" to reduce the stiffness of the corners that had too low sensitivity, but this a time consuming and difficult process. It is also possible to adjust the sensitivity of the most sensitive corners by adding resistance in series with the gages that give too high output, and at the same time shunt the bridge arm to keep the bridge balance unchanged. However, this is also a cumbersome process, which requires total recalibration and possible readjustment after the series resistor has been added. The invention provides for a much simpler adjustment process, as will be explained below.

FIG. 4 shows that the two gages 41, 42 on beam 12 and the two gages 43, 44 on beam 13 form a first set of two half-bridges. It is thus possible to shunt one of these first set of half-bridges with a pair of equal resistors without changing the zero balance of the bridge. If testing, with a load moved as illustrated in FIGS. 6a–6c, indicates that the gages 43, 44 on beam 13 are more sensitive than the gages 41, 42 on beam 12, two equal resistors 61', 61" connected as shown in FIG. 4 can be selected to equalize the side-to-side sensitivity of the load cell arrangement.

FIG. 4 further shows that the two gages 41, 43 on the rear ends 12", 13" of beams 12, 13 and the two gages 42, 44 on the front ends 12', 13' of beams 12, 13 also form a second set of two half-bridges. It is thus possible to shunt even one of these second set of half-bridges with a pair of equal resistors without changing the zero balance of the bridge. If testing, with a load moved as illustrated in FIGS. 5a–5c, indicates that the gages 42, 44 on the front ends 12', 13' of the beams 12, 13 are more sensitive than the gages 41, 43 on the rear ends 12", 13" of beams 12, 13, two equal resistors 62', 62" connected as shown in FIG. 4 can be selected to equalize the front-to back sensitivity of the load cell arrangement.

To determine the resistance value of the equal resistors 61' and 61", a load is first placed on a line midway between the front ends 12', 13' and the rear ends 12", 13" of respective beams 12, 13 near beam 12, and the output signal from the bridge, U12, is measured. The load is then moved on the same line to a position near beam 13, and the new output signal, U13, is measured. If U13 >U12, it will be necessary to shunt bridge arms with gages 43, 44 in order to reduce the sensitivity of the right half-bridge to
match the sensitivity of the left half-bridge. If U13 <U12, then bridge arms with gages 41, 42 would have to be shunted.

The correct value for the shunt resistors can easily be determined by connecting decade resistance boxes as shunts, and adjusting the decade boxes till the reading remains unchanged when the load is moved. The decade boxes are then replaced by metal film resistors with the same resistance values.

The correct value for the shunt resistors for strain gages 42, 44 (or 41, 43) needed to make the load cell arrangement insensitive to load movement in the front-to-rear direction can be determined the same way.

The shunt resistors can also be determined by calculations based on measurements made with the load placed at different positions on each of the two symmetry lines of the load cell arrangement, or by placing the load near the corners of the weighing device. Methods for such calculations are well known in the art.

A load cell arrangement according to the invention, as shown in FIG. 1, was made from a ⅛ inch thick plate of aluminum alloy 2024-T3 by stamping out the shape shown in FIG. 1. Overall length (front to rear) was 8", overall width was 7", and the width of the narrow necks 12', 12", 13' and 13" was ½". Reading errors for corner loading before and after sensitivity equalization by shunting of half-bridges as described above were measured by adjusting the sensitivity of the measuring device 51 so it read 10,000 counts for a load of 8 oz. placed at the center of the loading plate, and then moving the load between the extreme corners of the loading plate. The following are typical values:

A. Before sensitivity equalization the corner reading were:

| | |
|---|---|
| Left rear = 10,002 counts | Right rear = 10,130 counts |
| Left front = 9,874 counts | Right front = 9,998 counts |

B. After sensitivity equalization as described above and resetting of the sensitivity of the measuring device 51, the corner readings were:

| | |
|---|---|
| Left rear = 10,000 counts | Right rear = 9,999 counts |
| Left front = 9,999 counts | Right front = 10,000 counts. |

The equalization was made by connecting shunt resistors R61″ × R61″ × 24.700 kohm, and R62′ × R62″ × 55.000 kohm, as shown in FIG. 4. The values were determined by trial and error with decade resistor boxes as described above.

In practice, the resistors 61′, 61″, 62′ and 62″ will be selected from a standard series of resistors, such as a R96 series, so it is not possible to get exactly the desired resistance values, and the individual resistors also will differ from the nominal value by a small tolerance. The errors in sensitivity adjustment will, however, be insignificant in most cases. Better accuracy can be obtained by replacing each single resistor 61′, 61″, 62′ and 62″ by a slightly too large resistor in parallel with a much larger resistor for fine adjustment of the combined resistance value.

It should be understood that resistors 61′, 61″ in FIG. 4 may be added on the other side of the bridge as required, and that resistors 62′, 62″ may be added instead to the top half of the bridge, if required It is also possible to replace the two parallel shunt resistors (61″, 62″) across one arm (44) of the bridge by one single resistor with resistance equivalent to the combined resistance of the two parallel resistors without changing the performance or operation of the load cell arrangement.

The two equalizations of side-to side sensitivity and front to back sensitivity are totally independent, and the resistance values 61′, 61″, 62′, 62″ will be the same independently of the order in which side-to-side equalization and front-to-back equalization of sensitivities are made.

It should be noted that the gages 41, 43 and 42, 44 form half bridges only when the strain gages are mounted on top of one beam (12) and on the bottom of the other beam (13), but not when all four strain gages are mounted either on top or on the bottom of both beams, which is customary in the art because it is easiest to bond all strain gages at the same time, without turning the gaged plate over.

By adjusting half-bridges with pairs of resistors with equal value as described above, it is possible to adjust for sensitivity errors between the two sides and between the front and the back of the load cell arrangement to any desired degree of accuracy, but it is not possible to equalize the sensitivity of all four corners correctly in all cases by this method. For instance, after equalization the two pairs of opposite corners in the load cell arrangement may have equal sensitivity, but adjacent corners have different sensitivities, as shown in the example above. Because there is no remaining difference in sensitivity front-to-back or side-to-side, compensation of half-bridges only as disclosed above can not reduce the remaining errors in true corner sensitivities further. It has been found, however, that the remaining errors in practice are negligible Zero adjustment of the load cell disclosed herein is required, as for all strain gage load cells. A preferred method for zero adjustment is disclosed in a commonly-assigned, and currently filed and copending application, "Force Measuring Device with Zero Adjustment" by Rolf P. Haggstrom.

The invention is not limited to the exact design shown in FIGS. 1 to 4. It is for instance not necessary to form narrowed necks on the beams 12, 13 as illustrated, and the two beams 12, 13 may be separate beams connected at one end to a base and at the other end directly to a loading device The connections may be by bolting, welding, brazing, gluing or other suitable method, as long as the connections are rigid. The space required for deformation may be provided by stepping of the base and of the loading plate instead of by means of spacers as shown.

The invention is also useful for load cell arrangements where the strain gages are placed on bending stressed means connected to a base via weak or hinged connections, provided that the strain gages 41, 42, 43, 44 are placed alternatively on top and below the sensing area in such a way that adjacent strain gages are subject to strains of opposite polarity, so that adjacent arms of the strain gage bridge always are on opposite edges of the load cell arrangement.

What I claim is:

1. A force measuring load cell apparatus comprising:
   (a) four substantially parallel and coplanar bending beam members, arranged essentially at the four corners of a rectangle, and subject to stresses caused by a force or weight to be measured;
   (b) strain gage means, mounted on each bending beam member, for sensing strain in such a way that strain gage means on adjacent bending beam members sense strains of opposite polarity, and, connected in a bridge connection, for providing an output signal proportional to the sum of the strains sensed by said strain gage means;
   (c) a first pair of substantially equal shunt resistors, connected across strain gage means in said bridge connection mounted on a first pair of bending beam members forming a first side of said rectangle; and
   (d) a second pair of substantially equal shunt resistors connected across strain gage means in said bridge connection mounted on a second pair of beam members forming a second side of said rectangle perpendicular to said first side.

2. A force measuring load cell apparatus comprising:
   (a) two substantially parallel and coplanar beam means for receiving a force to be measured;
   (b) means for rigidly connecting first ends of the beam means together;
   (c) support means connected to the first ends of the beam means;

(d) means for rigidly connecting second ends of the beam means together;
(e) a force receiver supported by said second ends of the beam means;
(f) a first pair of strain gage means, mounted on top of one beam means near the ends of said one beam means for sensing strain;
(g) a second pair of strain gauge means, mounted on the bottom of the other beam means near the ends of said other beam means, for sensing strain;
(h) means for connecting said strain gage means in a bridge arrangement;
(i) a first pair of substantially equal shunt resistors connected across one of said pairs of strain gage means; and
(j) a second pair of substantially equal shunt resistors connected across a pair of strain gage means mounted near one end of said two beam means.

3. A force measuring load cell apparatus according to claim 2, in which two resistors connected across the same strain gage means are replaced by one single equivalent resistor 4. A method for sensitivity equalization of a force measuring load cell arrangement including two substantially parallel and coplanar beam means having means for rigidly connecting first ends of the beam means together, supporting means connected to the first ends of the beam means, means for rigidly connecting second ends of the beam means together and a force receiver supported by the second ends of the beam means, the method comprising the steps of
  (a) mounting strain gage means near the ends of the said beam means in such a way that adjacent strain gage means are subject to strains of opposite polarity;
  (b) connecting the strain gage means in a bridge arrangement providing an output signal proportional to the sum of the strains sensed by said strain gage means;
  (c) connecting a first pair of substantially equal shunt resistors across a first pair of strain gage means mounted on one of said beam means;
  (d) determining a resistance value for said first pair of shunt resistors to cause said output signal to be substantially independent of the location of a force applied perpendicular to the plane of the force receiver as it is moved in a direction transverse to the beam means;
  (e) connecting a second pair of substantially equal shunt resistors across a second pair of strain gage means mounted at one end of said beam means; and
  (f) determining a resistance value for said second pair of shunt resistors to cause said output signal to be substantially independent of the location of a force applied perpendicular to the plane of the force receiver as it is moved in a direction parallel to the beam means.

5. A method for sensitivity equalization of a force measuring load cell arrangement including two substantially parallel and coplanar beam means having means for rigidly connecting first ends of the beam means together, supporting means connected to the first ends of the beam means, means for rigidly connecting second ends of the beam means together and a force receiver supported by the second ends of the beam means, the method comprising the steps of:
  (a) mounting a first pair of strain gage means on the top side of one beam means;
  (b) mounting a second pair of strain gage means on the bottom side of the other beam means;
  (c) connecting the two pairs of strain gage means into a bridge arrangement for providing an output signal proportional to the sum of the strains sensed by the strain gage means;
  (d) connecting a pair of substantially equal resistors in parallel to one of the pairs of strain gages means to cause the response of the load cell arrangement to be substantially independent of the location of the force applied to the force receiver in a direction transverse to the beam means; and
  (e) connecting a pair of substantially equal resistors in parallel to two strain gage means on different beam means to cause the response of the load cell arrangement to be substantially independent of the location of the force applied to the force receiver in a direction parallel to the beam means.

* * * * *